Figure 1:
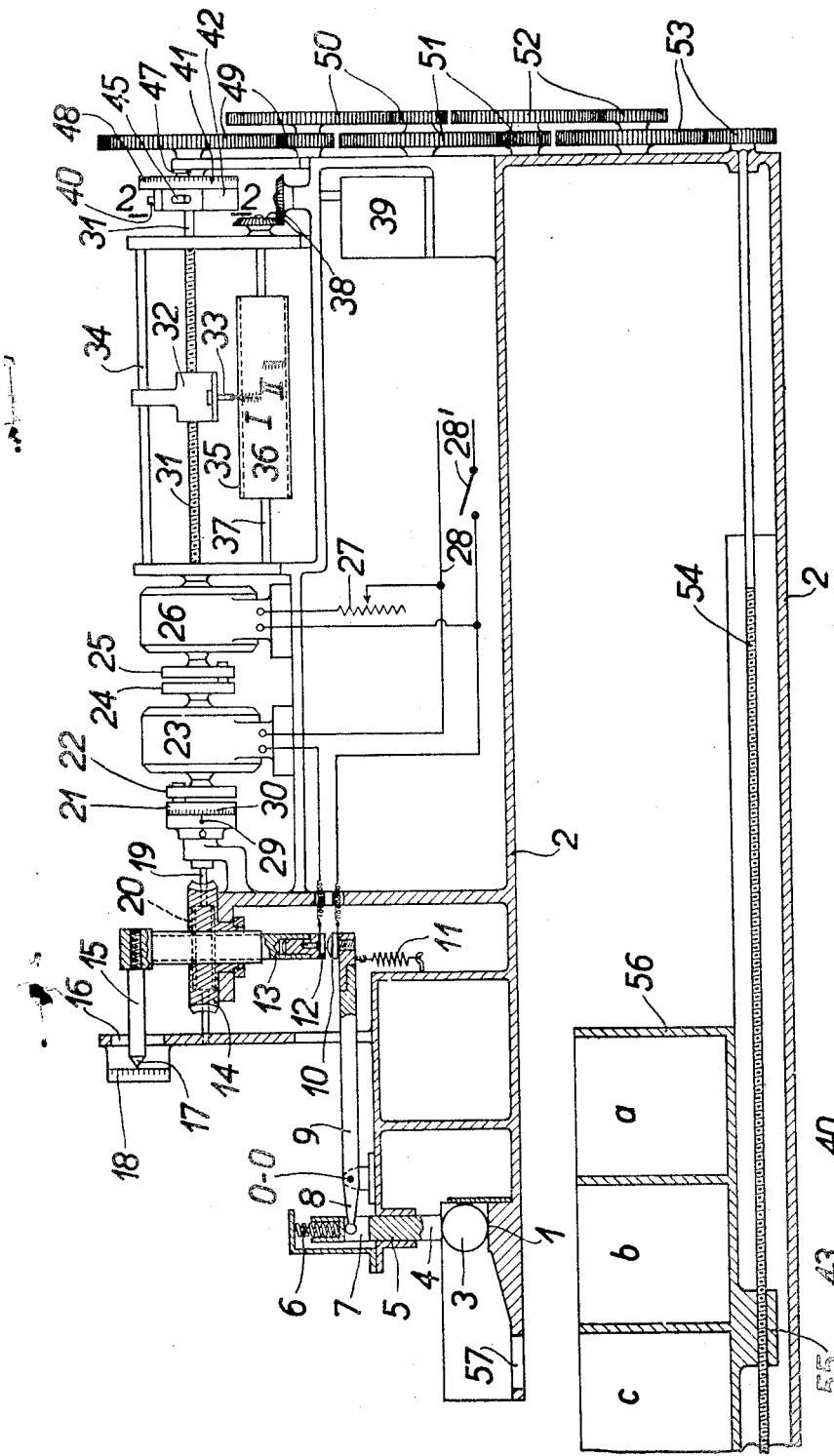

Dec. 22, 1942. H. SONNBERGER 2,305,816

MEASURING APPARATUS

Filed Sept. 13, 1938

Inventor:

Heinrich Sonnberger

Patented Dec. 22, 1942

2,305,816

UNITED STATES PATENT OFFICE 2,305,816

MEASURING APPARATUS

Heinrich Sonnberger, Jena, Germany; vested in the Alien Property Custodian

Application September 13, 1938, Serial No. 229,714
In Germany September 15, 1937

2 Claims. (Cl. 33—147)

The invention concerns an apparatus for instruments for measuring or transmitting the superficial differences or the differences of position of a body by means of a mechanism containing a feeler in contact with this body.

According to the invention, this apparatus is provided with controlling and driving means which, for eliminating errors of transmission of the said mechanism and thus increasing the measuring accuracy, can be coupled to the mechanism in such a manner that part of this mechanism effects two opposite and equal movements which alternate continuously, these movements being superposed on eventual other movements of this part of mechanism and having a magnitude corresponding to the transmission errors of the mechanism.

An apparatus of this kind can be used, for instance, with instruments for the exact measurement of the superficial differences or the differences of position of a body, or for the exact examination of the form of a cam body, or for the exact transmission of the movements imparted by a cam body to a feeler.

It is advisable in any case to use as controlling means two members adjustable relatively to each other which are influenced, respectively, by the said feeler and the said part of mechanism, the feeler being conveniently so coupled to the corresponding controlling member that displacements of the feeler impart to this controlling member movements whose magnitude is a multiple of that of the movements of the feeler.

The part of mechanism effecting the alternating movement can be operated by hand or automatically. In the case of automatic operation, use can be made for instance of a reversing motor the sense of rotation of which is continuously changed by the controlling means (for instance by a contact device cooperating with a relay).

It is advantageous to provide that the operation in opposite directions of the part of mechanism subject to the alternating movement is effected by two different driving organs only the one of which is influenced by the controlling means. These controlling means are suitably two contacts displaceable to and away from each other, and the driving organs, two electromotors the one of which is permanently connected to a source of current and has such a sense of rotation as to endeavour to make the two contacts touch each other, and the other of which is supplied with current only when the two contacts are closed and has such a sense of rotation as to endeavour to separate the two contacts from each other.

The new apparatus is especially simple when the controlling means are two contacts displaceable to and away from each other, the one contact being the surface of the body, and the other contact being coupled to the said part of mechanism.

In instruments of the said kind having a device for indicating a magnitude transmitted by a mechanism, it is advisable for the indication of the medial magnitude of the alternating movements to couple the part of mechanism exposed to this movement to a member of the indicating device in such a manner that to this member are imparted movements corresponding to those of the part of mechanism.

In instruments of the said kind having a device which comprises an uniformly displaced plotting surface and a plotting pencil displaceable at right angles to the direction of displacement of the plotting surface, and serves for recording a magnitude transmitted by a mechanism, it is advisable to so couple the plotting pencil to the part of mechanism exposed to the alternating movement that to this pencil are imparted displacements corresponding to the movements of the said part of mechanism.

In the case of instruments of the said kind which are to supply measuring magnitudes for any purposes, it is convenient to provide means for transmitting the medial magnitudes of the movements of the part of mechanism exposed to the alternating movement. It is advisable to make use, for instance, of the following arrangement. To the part of mechanism exposed to the alternating movement is coupled a rotatable arm, and provision is made of a disc which is freely rotatable relatively to, and about the axis of rotation of, the arm and has two suitably adjustable stops of such kind that the arm, when oscillating about a position of rest, can oscillate freely between these two stops and, in the case of additional rotations in any sense, causes this disc to follow.

Figure 2:
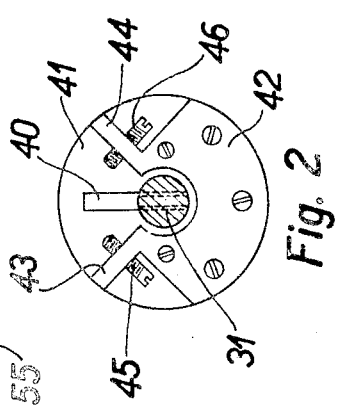

In the accompanying drawing Figs. 1 and 2 illustrate diagrammatically an instrument constructed according to the invention for measuring the diameters of balls and assorting the measured balls according to their diameters. Figure 1 shows a vertical section through said instrument and Figure 2 is a cross section through the line shown in Figure 1.

The ball sorting instrument according to Figure 1 has a housing 2 provided with a plane surface 1 for supporting the ball 3 which is being measured. A feeler 4 in contact with the ball 3 is displaceably mounted in a guide 5 disposed in the housing 2 and at right angles to the surface 1. The contact of the feeler 4 and the ball 3 is maintained by a spring 6. The feeler 4 has a longitudinal slit 7 into which extends the short arm 8 of a double lever mounted on the housing 2 and rotatable about an axis 0—0. The long arm 9 of the double lever supports the one member, 10, of a contact device consisting of two members and is so influenced by a spring 11 fixed to the housing 2 that this spring counteracts the spring 6. The tension of the spring 11 is smaller than necessary for so rotating the double lever 8, 9 about the axis 0—0 as to interrupt the contact of the feeler 4 with the ball 3. The other member, 12, of the contact device is fast with a threaded bolt 13 which engages a nut piece 14 constituting a worm wheel and mounted on the housing 2 in such a manner as to be rotatable about an axis at right angles to the surface 1. A pin 15 extending through a straight guide 16 provided on the housing 2 and parallel to the said axis of rotation prevents the bolt 13 from taking part in the rotations of the worm wheel 14. The bolt 13 can be displaced, accordingly, only at right angles to the surface 1. An index 17 integral with the pin 15 shows on a scale 18 of the housing 2 the position the bolt 13 assumes relatively to the housing. The scale 18 is so marked that a mutual touching of the contacts 10 and 12 entails the indication of the diameter of the ball 3 lying on the surface 1 and touched by the feeler 4.

The worm wheel 14 is in mesh with a worm 20 mounted on a shaft 19 rotatably disposed in the housing 2. On the shaft 19 is provided the one part, 21, of a pin coupling whose other part, 22, is fast with the one end of the shaft of a motor 23. The other end of the shaft of this motor 23 carries the one part, 24, of another pin coupling, whose other part, 25, is fast with the shaft of a motor 26. This motor 26 is connected over a resistance 27 to a net of current 28, so that closing a switch 28' supplies it with current and makes it turn the worm 20 in the sense necessary for displacing the bolt 13 so as to cause the contacts 12 and 10 to touch each other. When the switch 28' is closed, the motor 23 is fed by the net of current 28 only in the case of the contacts 10 and 12 touching each other. The sense of rotation of the motor 23 is reverse to that of the motor 26, and the turning moment of this motor, greater than that of the motor 26, so that the motor 23 can prevail on the motor 26 and reverse the sense of the rotation of the worm 20 and, accordingly, that of the displacement of the bolt 13, in consequence whereof the contacts 10 and 12 cease to touch each other. An index 29 fast with the housing 2 shows on a scale 30 on the part 21 of the pin coupling 21, 22 the position of the worm shaft 19 relative to the housing 2. A complete revolution of the worm shaft 19 and, accordingly, of the scale 30 corresponds to a displacement of the bolt 13 by one interval of the scale 18. Disregarding errors of mechanism, the index 29 shows on the scale 30 the magnitude zero when the index 17 is in coincidence with a division line of the scale 18. Whereas the indicating device 17, 18 provides the coarse indication of the diameter of the ball 3 under measurement, the indicating device 29, 30 supplies, accordingly, the fine indication.

The shaft 31 of the motor 26 has a thread in mesh with the carrier 32 of a plotting pencil 33. To prevent the carrier 32 from rotating about the axis of the motor shaft 31, the carrier is guided by a shaft 34 whose axis is parallel to that of the motor shaft 31. To the plotting pencil 33 is coordinated a drum 36 provided with a plotting paper 35 and mounted in the housing 2 by means of a shaft 37 rotatable about an axis parallel to that of the motor shaft 31, this drum being uniformly rotated by a pair of bevel gear wheels 38 and a clockwork 39.

The free end of the shaft 31 of the motor 26 carries an arm 40 which cooperates in the following manner with a disc 41 so mounted on the housing 2 that its axis of rotation coincides with that of the shaft 31 (cf. Figure 2). To the disc 41 is screwed a body 42 containing two rods 43 and 44. These rods contain adjusting screws 45 and 46 which serve as stops for the arm 40 when the shaft 31 effects greater rotations in the one sense or the other and whose distances from the arm 40 are adjustable. The described arrangement entails that the disc 41 is at rest when the arm 40 oscillates between the two stops 45 and 46, and that this disc 41 is made to follow when the arm 40 effects greater rotations, this rotation of the disc 41 being due to the arm 40 lying either against the stop 45 or against the stop 46. An index 47 of the housing 2 shows on a scale 48 of the disc 41 the position this disc assumes relatively to the housing 2. The index 47 and the scale 48 have such reciprocal positions and the scale 48 is so constructed that the index 47 indicates the magnitude zero on the scale 48 when the switch 28' is closed and the stops 45 and 46 are so adjusted that the arm 40 oscillates exactly from stop to stop, provided, of course, that the index 17 coincides with a division line of the scale 18.

The rotations of the disc 41 are transmitted by means of pairs of toothed wheels 49, 50, 51, 52 and 53 to a threaded spindle 54 rotatably mounted in the housing 2 and in mesh with a nut piece 55 of a box 56 which is displaceably mounted in the housing 2 and contains a plurality of compartments $a$, $b$ and $c$. On account of the spindle 54 being coupled with the disc 41 and, accordingly, with the feeler 4, an aperture 57 in the housing 2 and near the supporting surface 1 is above that of the said compartments which is to receive balls whose diameters correspond to a definite classification determined by two different positions of the feeler 4.

In the drawing, I and II are the lines of oscillation which the plotting pencil 33 plots on the paper 35 for two balls 3 that are measured subsequently to each other and have different diameters. The medial axis of each line of oscillation determines the medial magnitude of the diameter of that ball to the measurement of which the line of oscillation is due.

When using the said apparatus, it is merely necessary to place a ball 3 on the surface 1 and to switch on the motor 26. The double lever 8, 9 assumes the position corresponding to the diameter of the ball 3, and the following process takes place continuously. The motor 26 causes the two contacts 10 and 12 to touch each other. At this moment, the motor 23 receives current, prevails over the motor 26 and separates the two contacts. The motor 23 is, accordingly, currentless again, and the motor 26, operative. The plotting pencil plots on the paper 35 the line of oscillation corresponding to the diameter of the ball 3, and the box 56 assumes such a position that below the aperture 57 is the compartment meant to receive balls having diameters corresponding to the classification of that of the ball 3 under measurement. The index 17 shows the ball diameter coarsely on the scale 18. The corresponding fine indication is furnished by the indicating device 47, 48. On account of the continuous change of the sense of rotation of the shaft 19, the indicating device 29, 30 provides two magnitudes the medial magnitude of which corresponds to the said fine indication when, as necessary, the stops 45 and 46 are so adjusted that the arm 49 oscillates exactly from stop to stop.

I claim:

1. In an instrument for measuring or transmitting the superficial differences and the differences of position of a body, a support for said body, a feeler disposed on said support and displaceable from and into contact with said body, resilient means urging said feeler toward contact with said body, an electric reversing motor, with two circuits for rotating the motor in the one or the other sense, an electric contact device for directly influencing one of said two circuits, said contact device comprising two contact pieces adjustable relatively to said support and to each other, a relay for influencing the other of said two circuits and closing this other circuit as soon as the first said circuit is interrupted, means for connecting or coupling one of said two contact pieces to said feeler, and gearing means coupling the shaft of said motor to the other of said two contact pieces for separating said two contact pieces in case of said one circuit being closed and for bringing said two contact pieces into coincidence with each other in case of said other circuit being closed, said gearing means being adapted to translate a rotation of said shaft into slow movement.

2. In an instrument for measuring or transmitting the superficial differences and the differences of position of a body, a support for said body, a feeler disposed on said support and displaceable from and into contact with said body, resilient means urging said feeler toward contact with said body, two electromotors of opposite senses of rotation coupled to each other, one of said two motors being permanently supplied with current and having a turning moment inferior to that of the other motor, an electric contact device for influencing the circuit of said other motor, said contact device comprising two contact pieces adjustable relatively to said support and to each other, means for connecting or coupling one of said two contacts pieces to said feeler, and gearing means coupling the shaft of one of said two motors to the other of said two contact pieces for separating said two contact pieces in case of said circuit being closed and for bringing said two contact pieces into coincidence with each other in case of said circuit being interrupted, said gearing means being adapted to translate a rotation of said shaft into slow movement.

HEINRICH SONNBERGER.